US011677190B2

(12) United States Patent
Yang

(10) Patent No.: US 11,677,190 B2
(45) Date of Patent: Jun. 13, 2023

(54) SHIELDED CONNECTOR ASSEMBLY WITH IMPROVED THERMAL MANAGEMENT

(71) Applicant: Molex, LLC, Lisle, IL (US)

(72) Inventor: Che-Yuan Yang, New Taipei (TW)

(73) Assignee: Molex, LLC, Lisle, IL (US)

( * ) Notice: Subject to any disclaimer, the term of this patent is extended or adjusted under 35 U.S.C. 154(b) by 37 days.

(21) Appl. No.: 17/373,819

(22) Filed: Jul. 13, 2021

(65) Prior Publication Data

US 2022/0021160 A1 Jan. 20, 2022

(30) Foreign Application Priority Data

Jul. 14, 2020 (CN) .......................... 202010673551.X

(51) Int. Cl.
*H01R 13/658* (2011.01)
*H01R 13/6581* (2011.01)
(Continued)

(52) U.S. Cl.
CPC ....... *H01R 13/6581* (2013.01); *H01R 12/721* (2013.01); *H01R 13/506* (2013.01); *H01R 13/6271* (2013.01)

(58) Field of Classification Search
CPC .............. H01R 13/6581; H01R 13/506; H01R 13/6271; H01R 12/721
(Continued)

(56) References Cited

U.S. PATENT DOCUMENTS 8,382,509 B2 * 2/2013 David ................ H01R 13/6471
439/342
8,599,559 B1 * 12/2013 Morrison ............. H05K 9/0058
361/702
(Continued)

FOREIGN PATENT DOCUMENTS

| TW | 201347316 A | 11/2013 | |
| TW | I549381 B | * 9/2016 | ............. H01R 13/46 |
| TW | M596469 U | 6/2020 | |

*Primary Examiner* — Peter G Leigh

(57) ABSTRACT

A connector assembly includes a guide shielding cage, an internal biasing heat sink and two lateral heat dissipating members. The guide shielding cage includes a cage body and a partitioning bracket provided in the cage body, the cage body has a top wall and two side walls, the partitioning bracket has an upper wall and a lower wall which together define an interior receiving space, and the partitioning bracket and the cage body together define an upper receiving space and a lower receiving space, each side wall of the cage body is formed with a side window which is communicated with the interior receiving space, the lower wall of the partitioning bracket is formed with a lower window which allows the interior receiving space to be communicated with the lower receiving space. The internal biasing heat sink is provided in the partitioning bracket and has an internal heat dissipating member, the internal heat dissipating member enters into the lower receiving space via the lower window. The two lateral heat dissipating members are respectively positioned outside the two side walls of the cage body, the two lateral heat dissipating members and the internal heat dissipating member are connected with each other by means of connecting structures which respectively pass through the side windows, the two lateral heat dissipating members is capable of moving with the internal heat dissipating member along the up-down direction.

20 Claims, 7 Drawing Sheets

(51) Int. Cl.
*H01R 13/506* (2006.01)
*H01R 13/627* (2006.01)
*H01R 12/72* (2011.01)

(58) Field of Classification Search
USPC .......................................................... 439/487
See application file for complete search history.

(56) References Cited

U.S. PATENT DOCUMENTS

| | | | | |
|---|---|---|---|---|
| 8,830,679 B2* | 9/2014 | Scholeno | ............. | H05K 7/2049 |
| | | | | 174/16.3 |
| 9,518,785 B2* | 12/2016 | Szczesny | ............... | G02B 6/4269 |
| 9,547,140 B2 | 1/2017 | Wu et al. | | |
| 9,960,525 B2* | 5/2018 | Regnier | ............... | G02B 6/4201 |
| 10,153,571 B2 | 12/2018 | Kachlic | | |
| 10,249,983 B2* | 4/2019 | Regnier | ............... | H01R 13/533 |
| 10,446,960 B2* | 10/2019 | Guy Ritter | ......... | H05K 7/20336 |
| 10,511,118 B2* | 12/2019 | Beltran | ................... | H05K 3/00 |
| 10,551,580 B2* | 2/2020 | Regnier | ............... | G02B 6/3879 |
| 10,555,437 B2* | 2/2020 | Little | ................ | G02B 6/428 |
| 10,575,441 B2* | 2/2020 | Hsu | ..................... | H05K 7/2039 |
| 10,588,243 B2* | 3/2020 | Little | .................. | H01R 12/722 |
| 2012/0300403 A1* | 11/2012 | Scholeno | ............ | H05K 7/2049 |
| | | | | 361/702 |
| 2013/0164970 A1* | 6/2013 | Regnier | .................... | F28F 3/02 |
| | | | | 165/185 |
| 2013/0323963 A1 | 12/2013 | Morrison et al. | | |
| 2016/0064873 A1* | 3/2016 | Bucher | ............. | H01R 13/6658 |
| | | | | 439/59 |
| 2017/0054234 A1* | 2/2017 | Kachlic | ................ | H01R 12/712 |
| 2018/0054021 A1* | 2/2018 | Regnier | .................... | F28F 3/02 |
| 2019/0326703 A1* | 10/2019 | Chen | ..................... | H01R 12/53 |
| 2021/0105915 A1 | 4/2021 | Wang et al. | | |
| 2021/0235597 A1 | 7/2021 | Chopra et al. | | |

* cited by examiner

SHIELDED CONNECTOR ASSEMBLY WITH IMPROVED THERMAL MANAGEMENT

RELATED APPLICATIONS

The present application claims priority to Chinese Patent Application No. 202010673551.X filed Jul. 14, 2020 which is incorporated by reference in its entirety.

TECHNICAL FIELD

The present disclosure relates to a connector assembly, in particular relates to a connector assembly with a heat sink inside.

BACKGROUND ART

Chinese invention patent application issuance publication No. CN104470321B (corresponding to U.S. Pat. No. 9,547, 140B2) discloses a connector, the connector includes a cage, a plurality of partition sections, at least one heat conduction apparatus and at least one heat dissipation device. The cage of the connector includes a plurality of receiving passageways for respectively receiving plugs therein, the plurality of receiving passageways are arranged in at least two rows in a height direction and are arranged at least two columns in a lateral direction, two adjacent receiving passageways of each row in the lateral direction are separated by a partition plate. The plurality of partition sections each are provided between the two adjacent receiving passageways in the height direction. A heat conduction body of the heat conduction apparatus is inserted into the cage from a side wall of the cage and passes through the plurality of partition sections along the lateral direction, so that a heat conduction path is formed in the lateral direction. The heat dissipation devices are provided to two sides of the heat conduction body of the heat conduction apparatus respectively. However, the heat conduction body of the heat conduction apparatus of the connector needs to pass through the plurality of partition sections along the lateral direction, therefore the heat conduction body is immovable, that is to say, the heat conduction body and the heat dissipation devices provided to the sides of the heat conduction body are fixed and immovable. With respect to the heat conduction apparatus and the heat dissipation devices which all are immovable, it is necessary to add an elastic heat conduction pad and an elastic heat conduction block into the respective receiving passageway so as to contact the respective plug. Therefore, the heat conduction apparatus and heat dissipating device has more components and a relatively high thermal resistance and is limited in heat dissipating capability. In addition, all the receiving passageways including the receiving passageways in the height direction and the receiving passageways in the lateral direction conduct heat through the path of the same heat conduction body, the heat is not easy to quickly dissipate out but is accumulated to generate a high temperature.

Chinese invention patent application publication No. CN106469878A (corresponding to U.S. Pat. No. 10,153, 571B2) discloses a connector, a cage of the connector includes an intermediate section, the intermediate section includes an upper wall and a lower wall, the upper wall and the lower wall define an upper port and a lower port in the cage, the lower wall includes a hole formed therein so that the intermediate section is communicated with the lower port. A biased heat sink of the connector is arranged in the intermediate section between the upper port and the lower port, the biased heat sink extends into the lower port via the hole. The biased heat sink of the connector can directly contact the plug to more efficiently dissipate the heat, but the biased heat sink is provided inside the cage and dissipates heat only depending on the air flow guided into the intermediate section. Therefore, in an application circumstance of high frequency transmission, it is desired that these heat dissipating structures can have better heat dissipating capability to ensure stability of an equipment in long time operation.

SUMMARY

Therefore, an object of the present disclosure is to provide a connector assembly which can improve at least one problem in the prior art.

According, in some embodiments, a connector assembly of the present disclosure comprises a guide shielding cage, an external heat sink, an internal biasing heat sink and two lateral heat dissipating members. The guide shielding cage comprises a cage body and a partitioning bracket provided in the cage body, the cage body has a top wall and two side walls, the partitioning bracket has an upper wall and a lower wall which together define an interior receiving space, and the partitioning bracket and the cage body together define an upper receiving space and a lower receiving space, the top wall of the cage body is formed with an upper window which is communicated with the upper receiving space, each side wall of the cage body is formed with a side window which is communicated with the interior receiving space, the lower wall of the partitioning bracket is formed with a lower window which allows the interior receiving space to be communicated with the lower receiving space. The external heat sink is provided to the top wall of the cage body and enters into the upper receiving space via the upper window. The internal biasing heat sink is provided in the partitioning bracket and has an internal heat dissipating member, the internal heat dissipating member enters into the lower receiving space via the lower window, the internal heat dissipating member is capable of moving along an up-down direction. The two lateral heat dissipating members are respectively positioned outside the two side walls of the cage body, the two lateral heat dissipating members and the internal heat dissipating member are connected with each other by means of connecting structures which respectively pass through the side windows, a width of the side window in the up-down direction is larger than a width of the connecting structure in the up-down direction, so that the two lateral heat dissipating members is capable of moving with the internal heat dissipating member along the up-down direction.

In some embodiments, the connecting structure comprises a first connecting portion which is formed to the internal heat dissipating member and a second connecting portion which is formed to the lateral heat dissipating member, the first connecting portion and the second connecting portion can be locked by means of a locking member.

In some embodiments, the connecting structure further comprises a positioning post and a positioning hole which cooperate with each other and are formed to the first connecting portion and the second connecting portion.

In some embodiments, the connecting structure further comprises a thermally conductive material connecting layer which is provided between the first connecting portion and the second connecting portion.

In some embodiments, the first connecting portion and the second connecting portion each are a convex structure.

In some embodiments, the internal heat dissipating member has a thermal coupling portion which enters into the lower receiving space via the lower window, the internal biasing heat sink further comprises a biasing spring which is provided between the internal heat dissipating member and the upper wall of the partitioning bracket.

In some embodiments, the lateral heat dissipating member has a plate body which extends along the corresponding side wall and heat dissipating fins which are formed outwardly from the plate body, the internal heat dissipating member has a base plate and heat dissipating fins which are formed upwardly from the base plate.

In the present disclosure, the two sides of the internal heat dissipating member which is movable are connected with the lateral heat dissipating members respectively and the lateral heat dissipating members are respectively positioned outside the two side walls of the guide shielding cage, heat in the internal heat dissipating member can be guided to outside the guide shielding cage, which not only increases an area of heat dissipation, but also increases the interaction with an external air flow, so that the heat dissipating capability is enhanced. On the other hand, in the present disclosure, the external heat sink, the internal biasing heat sink and the lateral heat dissipating members which are connected with the internal biasing heat sink are provided for the upper receiving space and the lower receiving space, the connector assembly can completely improve the overall heat dissipating capability for various parts of the guide shielding cage.

BRIEF DESCRIPTION OF THE DRAWINGS

Other features and effects of the present disclosure will be apparent in an embodiment referring to the accompanying figures, in which.

DETAILED DESCRIPTION OF THE PREFERRED EMBODIMENTS

Figure 1:
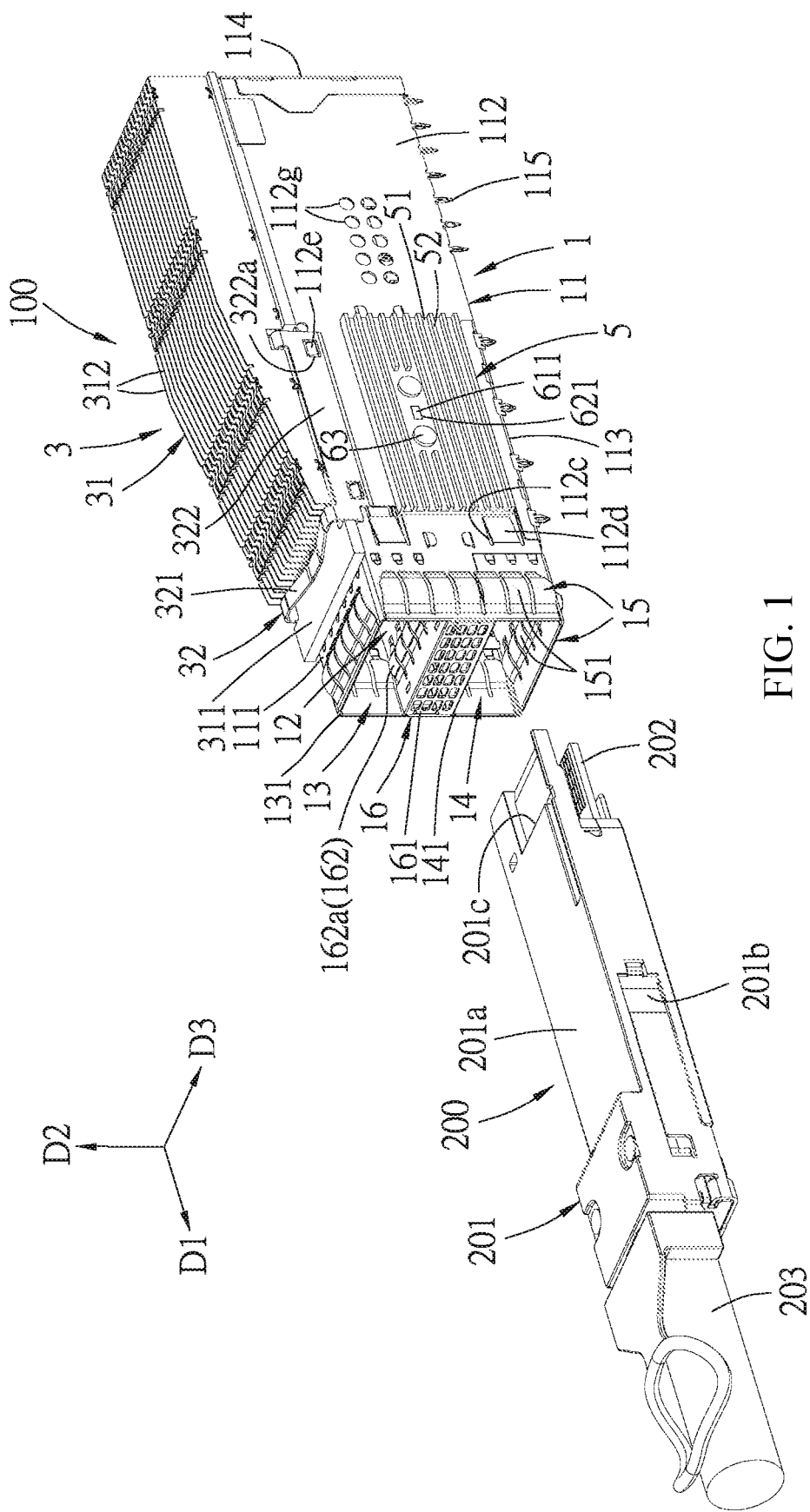
FIG. 1 is a perspective view of an embodiment of a connector assembly of the present disclosure and a pluggable module.
Figure 2:
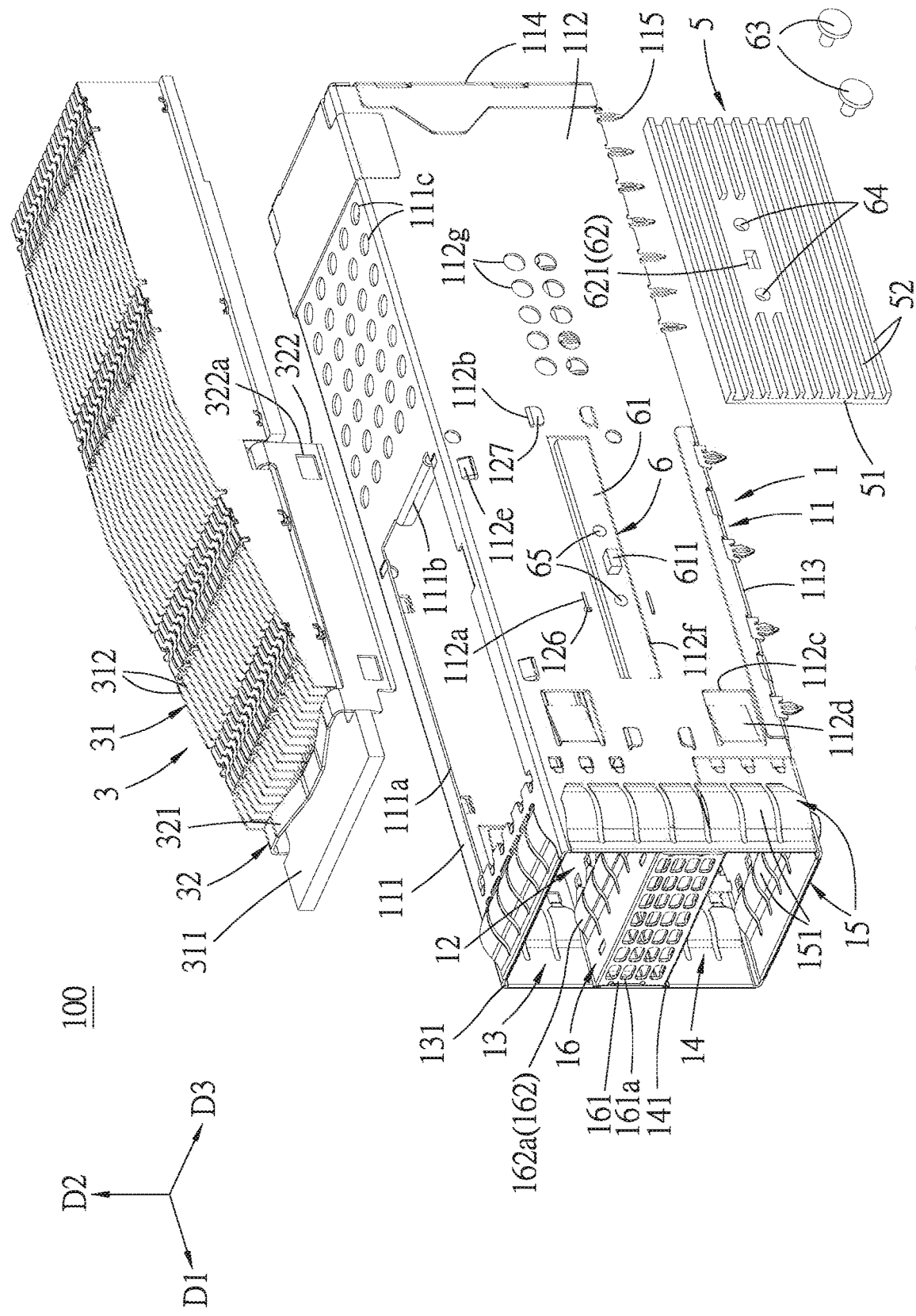
FIG. 2 is an exploded perspective view of the embodiment.
Figure 3:
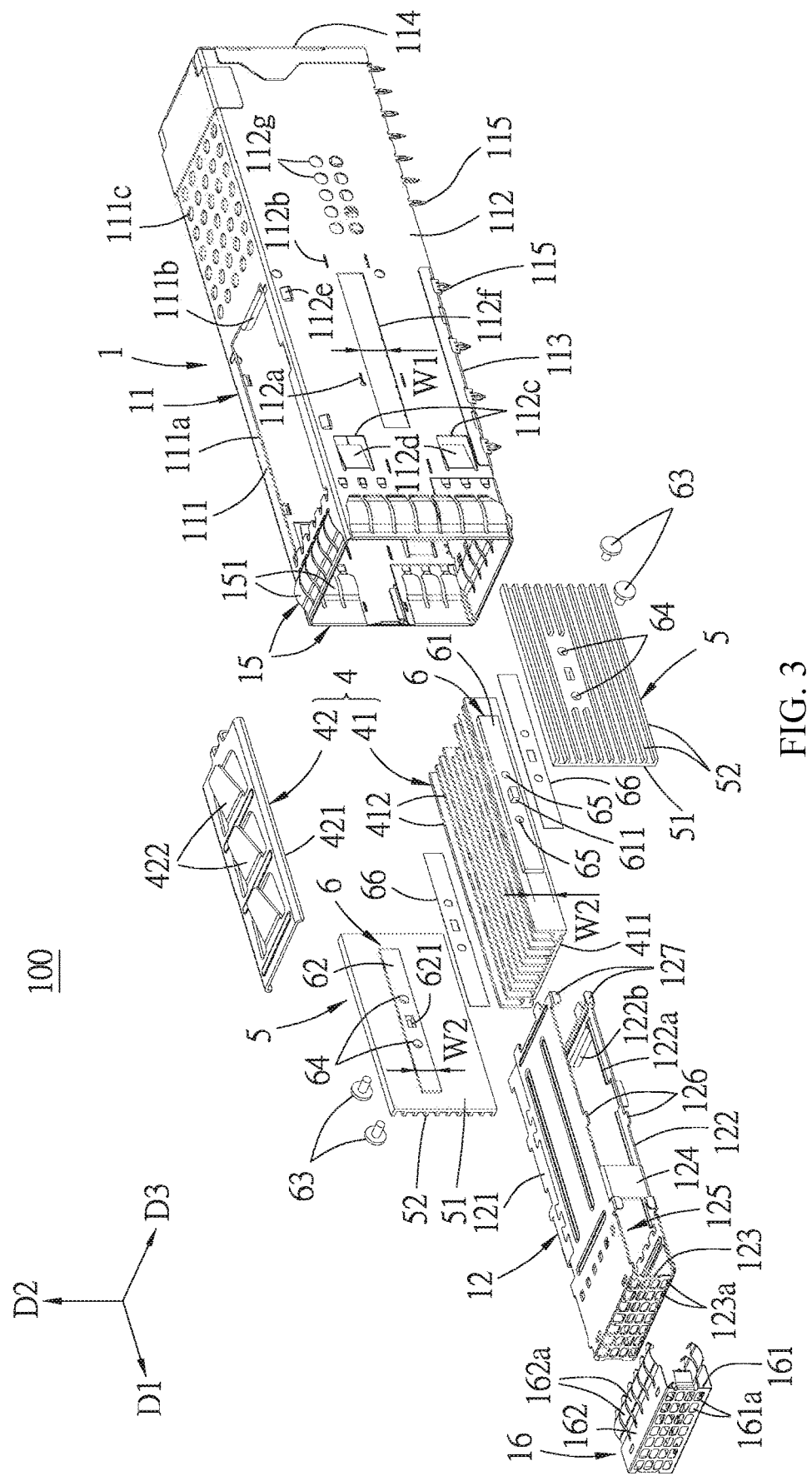
FIG. 3 is a further exploded perspective view of the embodiment with an external heat sink of the embodiment omitted.
Figure 4:
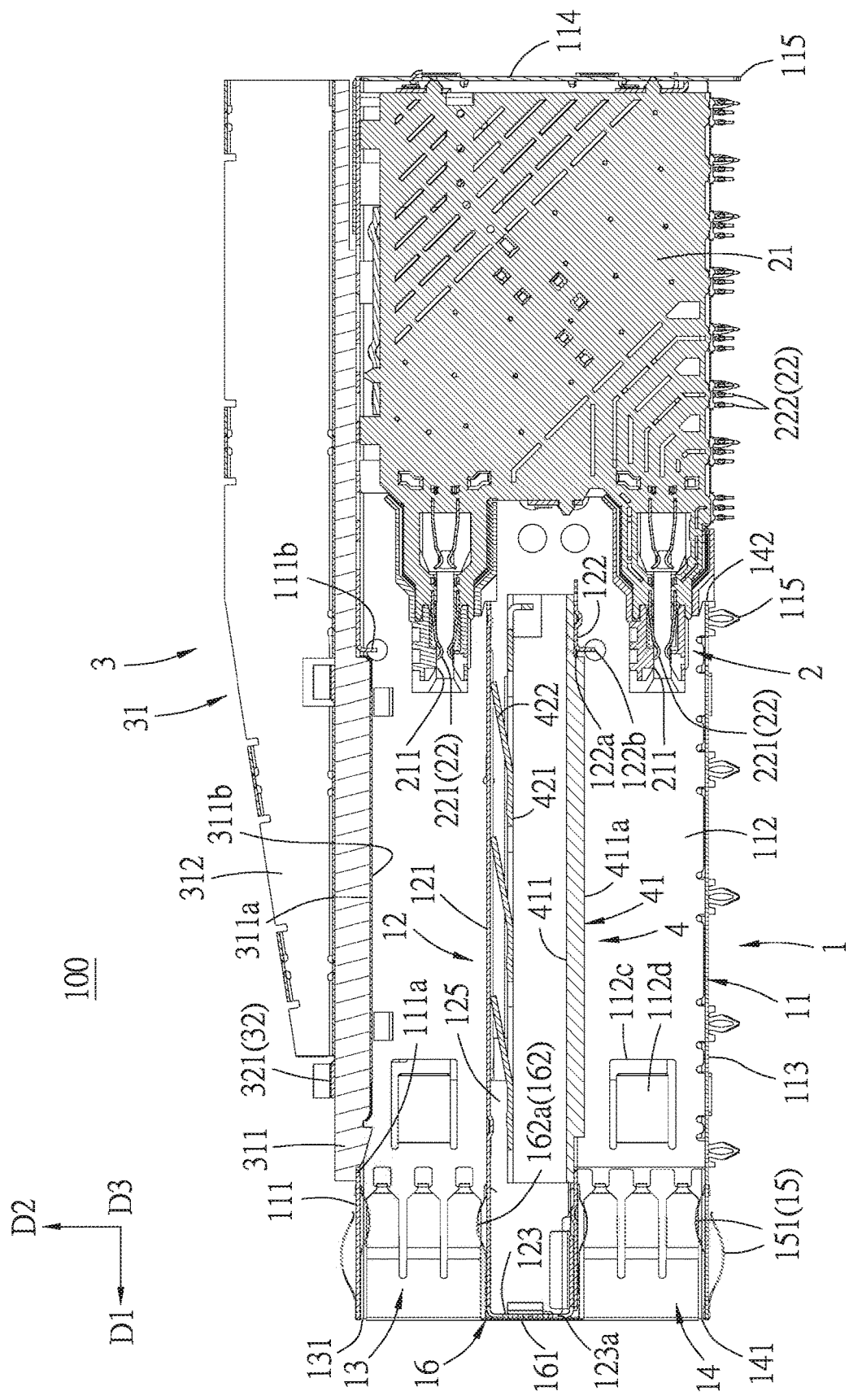
FIG. 4 is a cross-sectional view of the embodiment.

Referring to FIGS. 1-4, an embodiment of a connector assembly 100 of the present disclosure is adapted to mate with a pluggable module 200. The connector assembly 100 includes a guide shielding cage 1, a receptacle connector 2 and an external heat sink 3, an internal biasing heat sink 4 and two lateral heat dissipating members 5.

The guide shielding cage 1 includes a cage body 11 which extends along a front-rear direction D1 (an arrow pointing direction is front and an opposite direction is rear) and a partitioning bracket 12 which is provided in the cage body 11. The cage body 11 has a top wall 111 which is positioned at a top of the cage body 11 in an up-down direction D2 (an arrow pointing direction is up and an opposite direction is down), two side walls 112 which extend from two sides of the top wall 111 respectively and face each other in a left-right direction D3 (an arrow pointing direction is right and an opposite direction is left), a bottom wall 113 which is connected to front segments of bottom edges of the two side walls 112, and a rear wall 114 which is connected to a rear edge of the top wall 111 and rear edges of the two side walls 112. The partitioning bracket 12 has an upper wall 121 and a lower wall 122 which face each other in the up-down direction, a front wall 123 which is connected to a front edge of the upper wall 121 and a front edge of the lower wall 122, and connecting walls 124 which each are connected to a side edge of the upper wall 121 and a side edge of the lower wall 122, the upper wall 121, the lower wall 122, the front wall 123 and the connecting walls 124 together define an interior receiving space 125. It is noted that, in a varied embodiment, the partitioning bracket 12 may not have the front wall 123 and the connecting walls 124, and thus is not limited to the present embodiment. The partitioning bracket 12 and the cage body 11 together define an upper receiving space 13 and a lower receiving space 14. In the present embodiment, a rear segment of the upper receiving space 13 and a rear segment of the lower receiving space 14 are communicated with each other. The upper receiving space 13 has an upper insertion opening 131 which is positioned in the front of the upper receiving space 13, the lower receiving space 14 has a lower insertion opening 141 which is positioned in the front of the lower receiving space 14 and a bottom opening 142 which is positioned at the rear of the lower receiving space 14 and at a bottom of the lower receiving space 14 and is defined together by the side walls 112, the bottom wall 113 and the rear wall 114 of the cage body 11. Each side wall 112 of the cage body 11 has a positioning hole 112a and a fixing hole 112b which penetrate each side wall 112, the partitioning bracket 12 further has positioning pieces 126 which are formed to the upper wall 121 and fixing bend pieces 127 which are formed to the lower wall 122, the positioning pieces 126 respectively pass through the positioning holes 112a of the two side walls 112 and the fixing bend pieces 127 respectively pass through the fixing holes 112b of the two side walls 112 and then are bent and fixed, so that the partitioning bracket 12 is stably assembled to the cage body 11.

The guide shielding cage 1 is used to be provided on a circuit board (not shown). The cage body 11 of the guide shielding cage 1 further has a plurality of press-fitting legs 115 which are formed to bottom edges of the two side walls 112 and a bottom edge of the rear wall 114, the plurality of press-fitting legs 115 are used to be pressed into first press-fitting holes (not shown) of the circuit board, so that the guide shielding cage 1 is fixed to the circuit board and may be electrically connected to a ground path. The receptacle connector 2 is provided to the rear segment of the upper receiving space 13 and the rear segment of the lower receiving space 14 in the guide shielding cage 1 via the bottom opening 142, and is provided on the circuit board. The receptacle connector 2 has a housing 21 which is insulative and a plurality of terminals 22 which are provided to the housing 21. The housing 21 has two mating slots 211 which face forwardly and respectively correspond to the upper receiving space 13 and the lower receiving space 14. Each terminal 22 has a contact portion 221 which is positioned in the corresponding mating slot 211 and a press-fitting tail portion 222 which extends downwardly out of a bottom of the housing 21. The press-fitting tail portions 222 of the plurality of terminals 22 are respectively used to be pressed into second press-fitting holes (not shown) of the circuit board, so that the receptacle connector 2 is fixed to the circuit board.

The pluggable module 200 has a shell 201, a mating circuit board 202 and a cable 203. The shell 201 has an insertion portion 201a which is used to insert into the upper receiving space 13 or the lower receiving space 14, the mating circuit board 202 protrudes from the insertion portion 201a and is used to mate with the corresponding mating slot 211. The cable 203 is connected to a rear end of the shell 201 and is electrically connected to the mating circuit board 202. Each side wall 112 of the guide shielding cage 1 has two openings 112c which respectively correspond to the upper receiving space 13 and the lower receiving space 14, an inward extension elastic piece 112d is configured at each opening 112c and obliquely extends toward the inside of the guide shielding cage 1 and toward the rear. A left side and a right side of the insertion portion 201a of the pluggable module 200 each are provided with a locking groove 201b which engages with the corresponding inward extension elastic piece 112d, the inward extension elastic pieces 112d at the openings 112c are used to engage with the locking grooves 201b of the pluggable module 200 which is inserted into the upper receiving space 13 or the lower receiving space 14, so as to attain a locking effect. In addition, an alignment structure 201c is formed at a top of a front end of the insertion portion 201a of the shell 201. The top wall 111 of the cage body 11 is formed with an upper window 111a which is communicated with the upper receiving space 13 and an upper stopping portion 111b which extends downwardly from a rear segment of the upper opening 111a into the upper receiving space 13. The lower wall 122 of the partitioning bracket 12 is formed with a lower window 122a which allows the interior receiving space 125 to be communicated with the lower receiving space 14 and a lower stopping portion 122b which extends downwardly from a rear segment of the lower window 122a into the lower receiving space 14. The upper stopping portion 111b and the lower stopping portion 122b are used to stop the alignment structure 201c so as to limit an insertion position of the pluggable module 200.

In the present embodiment, the connector assembly 100 may be provided in a mounting hole (not shown) of a casing (not shown). The guide shielding cage 1 further has a plurality of cage grounding members 15 which are provided at a front end of the cage body 11 and a partitioning bracket grounding members 16 which are provided to a front segment of the partitioning bracket 12. The plurality of cage grounding members 15 have a plurality of elastic fingers 151 which extend rearwardly at the front end of the cage body 11 and are distributed to an outer side and an inner side of the cage body 11, the elastic finger 151 positioned at the outer side of the cage body 11 is used to contact an edge of the mounting hole of the casing, the elastic finger 151 positioned at the inner side of the cage body 11 is used to contact the pluggable module 200. The partitioning bracket grounding member 16 has a sheet 161 which is provided to a front side surface of the front wall 123 of the partitioning bracket 12 and two grounding pieces 162 which respectively extend rearwardly from an upper edge and a lower edge of the sheet 161 so as to respectively extend into the upper receiving space 13 and the lower receiving space 14. Each grounding piece 162 has a plurality of elastic fingers 162a which extend rearwardly and are used to contact the pluggable module 200.

Referring to FIGS. 1-4, the external heat sink 3 is provided to the top wall 111 of the cage body 11 and enters into the upper receiving space 13 via the upper window 111a. The external heat sink 3 includes an external heat dissipating member 31 and a clip 32 which presses against the external heat dissipating member 31 and latches with the side walls 112 of the cage body 11. The external heat dissipating member 31 has a base plate 311 which is provided to the top wall 111 and a plurality of heat dissipating fins 312 which each extend along the front-rear direction D1 and which are arranged in the left-right direction D3, latch with each other and are provided to a top surface of the base plate 311. In the present embodiment, for example, the plurality of heat dissipating fins 312 may be provided to the base plate 311 by welding and avoid the clip 32, however, it is noted that, in a varied embodiment, the plurality of heat dissipating fins 312 may be integrally formed upwardly from the base plate 311. The base plate 311 has a thermal coupling portion 311a which extends downwardly into the upper receiving space 13 via the upper window 111a, the thermal coupling portion 311a is used to contact the pluggable module 200 (see FIG. 1) which is inserted into the upper receiving space 13, so as to enhance the heat dissipation of the external heat sink 3. In the present embodiment, a bottom surface of the thermal coupling portion 311a is provided with a thermally conductive interface material 311b which is used to contact the pluggable module 200. For example, the thermally conductive interface material 311b may be a thermally conductive pad which includes a phase change material. The external heat sink 3 is assembled to the top wall 111 of the cage body 11 by means of the clip 32. The clip 32 has two pressing portions 321 and two side plate portions 322, each pressing portion 321 extends along the left-right direction D3 and allows a middle part of each pressing portion 321 to elastically press downwardly against the base plate 311 of the external heat dissipating member 31, the two side plate portions 322 extend downwardly from a left end and a right end of the two pressing portions 321 respectively and latch with the two side walls 112 of the cage body 11 respectively. The two pressing portions 321 elastically press against the base plate 311 of the external heat dissipating member 31, so as to allow that the external heat dissipating member 31 is capable of moving along the up-down direction D2 and allow the thermal coupling portion 311a to extend into the upper receiving space 13 via the upper window 111a and elastically contact the pluggable module 200 so as to ensure contacting completeness and enhance heat dissipating performance. Each side wall 112 is formed with latching pieces 112e, each side plate portion 322 is formed with two latching holes 322a which each latch with the corresponding latching piece 112e, so the external heat sink 3 is latched to the cage body 11 by means of the clip 32.

The internal biasing heat sink 4 is provided in the partitioning bracket 12 and has an internal heat dissipating member 41 and a biasing spring 42 which is provided between the internal heat dissipating member 41 and the upper wall 121 of the partitioning bracket 12. The internal heat dissipating member 41 has a base plate 411 and a plurality of heat dissipating fins 412 which are formed upwardly from the base plate 411, each extend along the front-rear direction D1 and are arranged side by side in the left-right direction D3. The base plate 411 has a thermal coupling portion 411a which enters into the lower receiving space 14 via the lower window 122a, the thermal coupling portion 411a is used to contact the pluggable module 200 (see FIG. 1) which is inserted into the lower receiving space 14 s as to enhance heat dissipation of the internal biasing heat sink 4. The biasing spring 42 has a pressing plate 421 which presses against tops of the heat dissipating fins 412 of the internal heat dissipating member 41 and a plurality of plate-shaped spring pieces 422 which extend from the pressing plate 421 and abut against the upper wall 121 of the partitioning bracket 12. It is noted that, the biasing spring 42 also may be a spring structure of other styles, and is not limited to the present embodiment. A biasing force applied by the biasing spring 42 makes the internal heat dissipating member 41 capable of moving in the up-down direction D2 and makes the thermal coupling portion 411a of the internal heat dissipating member 41 elastically contact the pluggable module 200, so as to ensure contact completeness and enhance heat dissipating performance.

Figure 5:
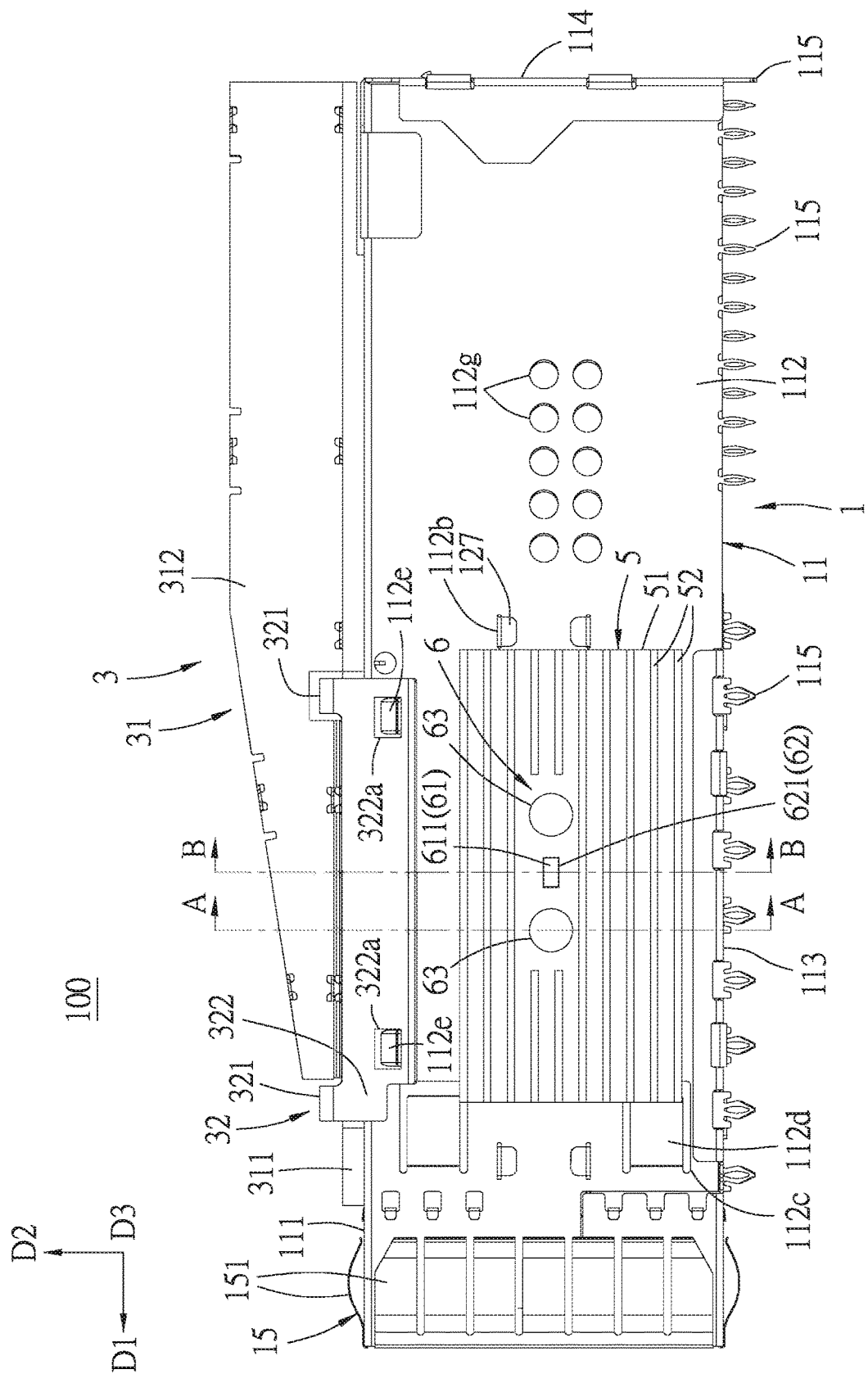
FIG. 5 is a side view of the embodiment.
Figure 6:
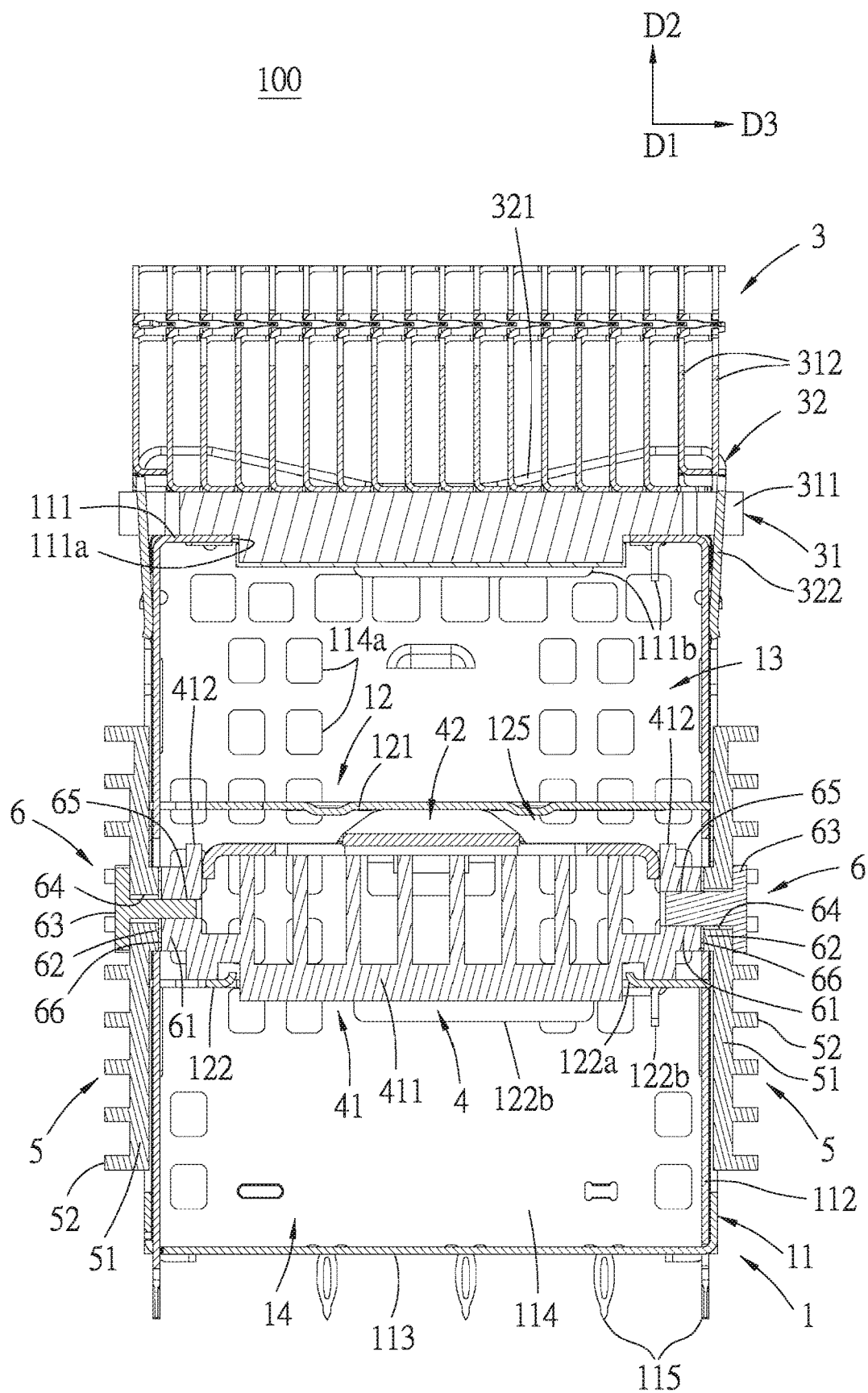
FIG. 6 is a cross-sectional view taken along a line A-A of FIG. 5.
Figure 7:
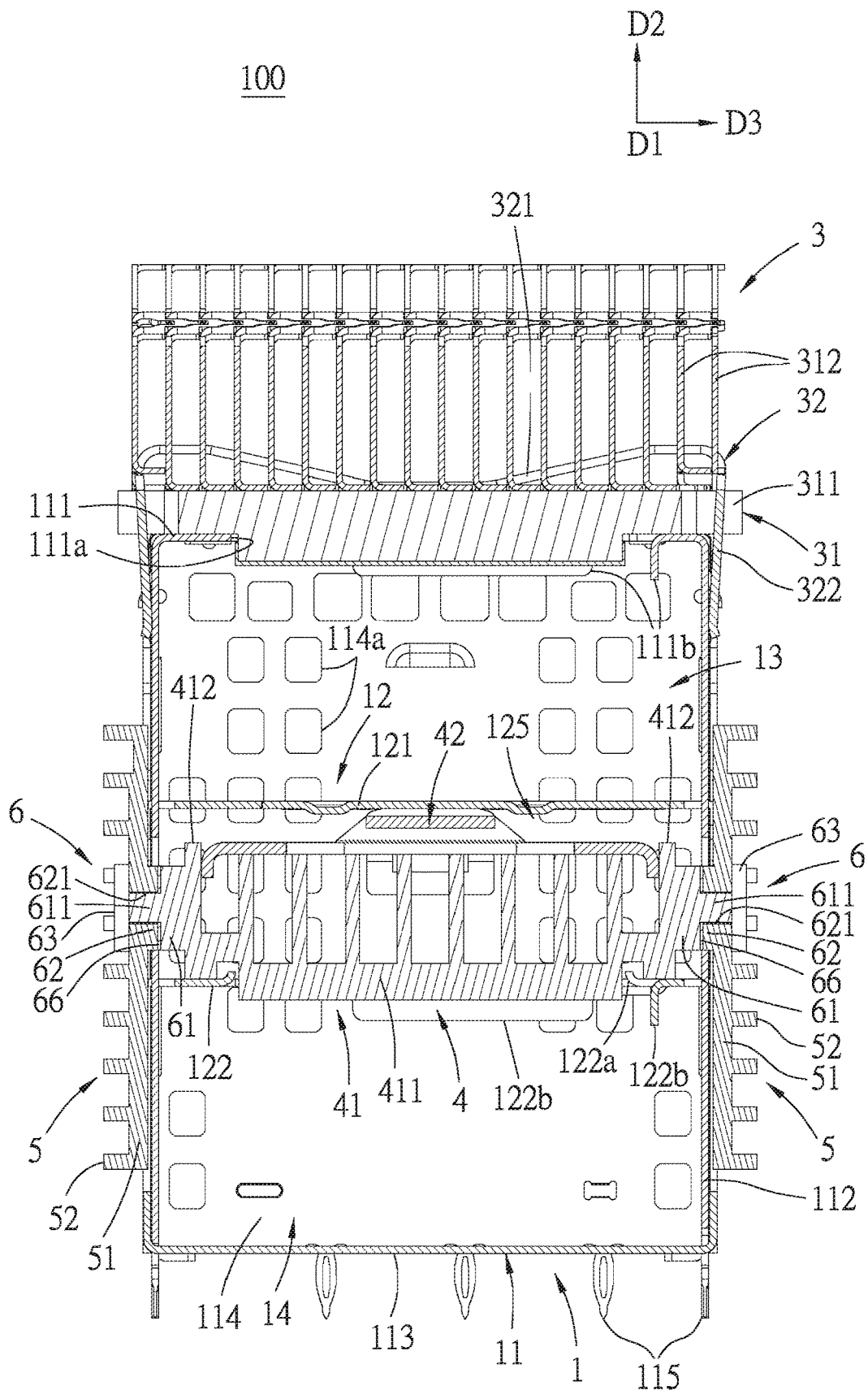
FIG. 7 is a cross-sectional view taken along a line B-B of FIG. 5.

Referring to FIG. 1, FIG. 3 and FIG. 5-7, each side wall 112 of the cage body 11 is formed with a side window 112f which is communicated with the interior receiving space 125 and extends along the front-rear direction D1. Two lateral heat dissipating members 5 are respectively positioned outside the two side walls 112 of the cage body 11, the two lateral heat dissipating members 5 and the internal heat dissipating member 41 are connected with each other by means of connecting structures 6 which respectively pass through the corresponding side windows 112f, a width W1 of the side window 112f in the up-down direction D2 is larger than a width W2 of the connecting structure 6 in the up-down direction D2 so that the two lateral heat dissipating members 5 can move with the internal heat dissipating member 41 along the up-down direction D2. In the present disclosure, the two sides of the internal heat dissipating member 41 which is movable are connected with the lateral heat dissipating members 5 respectively and the lateral heat dissipating members 5 are respectively positioned outside the two side walls 112 of the guide shielding cage 1, heat in the internal heat dissipating member 41 can be guided to outside the guide shielding cage 1, which not only increases an area of heat dissipation, but also increases the interaction with an external air flow, so that the heat dissipating capability is enhanced. On the other hand, the external heat sink 3, the internal biasing heat sink 4 and the lateral heat dissipating members 5 which are connected with the internal biasing heat sink 4 are provided for the upper receiving space 13 and the lower receiving space 14, the connector assembly 100 can completely improve the overall heat dissipating capability for various parts of the guide shielding cage 1.

In the present embodiment, each lateral heat dissipating member 5 has a plate body 51 which extends along the corresponding side wall 112 and a plurality of heat dissipating fins 52 which each are formed outwardly from the plate body 51 in the left-right direction D3 and which are arranged side by side in the up-down direction D2. The connecting structure 6 includes: a first connecting portion 61 which is formed to an outer side surface of the internal heat dissipating member 41 in the left-right direction; a second connecting portion 62 which is formed to an inner side surface of the plate body 51 of the corresponding lateral heat dissipating member 5, the inner side surface of the plate body 51 of the corresponding lateral heat dissipating member 5 faces the internal heat dissipating member 41; and a positioning post 611 and a positioning hole 621 which are formed to the first connecting portion 61 and the second connecting portion 62 and cooperate with each other. A cross section of the positioning post 611 and a cross section of the positioning hole 621 are rectangular in the present embodiment. Specifically, the positioning post 611 is formed to the first connecting portion 61 and the positioning hole 621 is formed to the second connecting portion 62, however, in other embodiments, the positioning post 611 may be formed to the second connecting portion 62 and the positioning hole 621 may be formed to the first connecting portion 61. In addition, the first connecting portion 61 and the second connecting portion 62 each are a convex structure, however, in other embodiments, one of the first connecting portion 61 and the second connecting portion 62 may be a convex structure and the other of the first connecting portion 61 and the second connecting portion 62 is a concave structure which cooperates with the convex structure. The first connecting portion 61 and the second connecting portion 62 can be locked by means of a locking member 63. The locking member 63 may be a locking element, such as a screw. Specifically, the connecting structure 6 further includes a through hole 64 which is formed through the plate body 51 of the lateral heat dissipating members 5 and the second connecting portion 62 and allows the locking member 63 to pass through and a locking hole 65 which is formed to the first connecting portion 61 and allows the locking member 63 to lock therewith by screwing, the locking member 63 passes through the through hole 64 and is screwed to the locking hole 65 so as to lock the first connecting portion 61 and the second connecting portion 62.

In addition, in the present embodiment, the connecting structure 6 further includes a thermally conductive material connecting layer 66 which is provided between the first connecting portion 61 and the second connecting portion 62. For example, the thermally conductive material connecting layer 66 may be a thermally conductive paste or a thermally conductive adhesive or the like. The thermally conductive material connecting layer 66 enables the thermal conductivity between the first connecting portion 61 and the second connecting portion 62 to be better.

It is noted that, although the base plate 411 and the heat dissipating fins 412 of the internal heat dissipating member 41 are configured integrally in structure in the present embodiment, the base plate 411 and the heat dissipating fins 412 of the internal heat dissipating member 41 also may be assembled in structure in other embodiments. Similarly, although the plate body 51 and heat dissipating fins 52 of the lateral heat dissipating member 5 are configured integrally in structure in the present embodiment, the plate body 51 and the heat dissipating fins 52 of the lateral heat dissipating member 5 also may be assembled in structure in other embodiments.

In addition, the front wall 123 of the partitioning bracket 12 is formed with a plurality of first front heat dissipating holes 123a, the sheet 161 of the partitioning bracket grounding member 16 is formed with a plurality of second front heat dissipating holes 161a which correspond to the plurality of first front heat dissipating holes 123a respectively, the plurality of first front heat dissipating holes 123a and the plurality of second front heat dissipating holes 161a are communicated with the interior receiving space 125 so that the air flow can enter the interior receiving space 125 more easily, in turn the heat dissipating performance of the internal biasing heat sink 4 is enhanced. The top wall 111 of the cage body 11 is formed with a plurality of top heat dissipating holes 111c, each side wall 112 of the cage body 11 is formed with a plurality of side heat dissipating holes 112g, the rear wall 114 of the cage body 11 is formed with a plurality of rear heat dissipating holes 114a. The plurality of top heat dissipating holes 111c, the plurality of side heat dissipating holes 112g and the plurality of rear heat dissipating holes 114a are communicated with the upper receiving space 13 and the lower receiving space 14, so that the air flow can enter the upper receiving space 13 and the lower receiving space 14 more easily, in turn the heat dissipating performance of the connector assembly 100 is enhanced.

In conclusion, in the present disclosure, the two sides of the internal heat dissipating member 41 which is movable are connected with the lateral heat dissipating members 5 respectively and the lateral heat dissipating members 5 are respectively positioned outside the two side walls 112 of the guide shielding cage 1, heat in the internal heat dissipating member 41 can be guided to outside the guide shielding cage 1, which not only increases an area of heat dissipation, but also increases the interaction with an external air flow, so that the heat dissipating capability is enhanced. On the other hand, in the present disclosure, the external heat sink 3, the internal biasing heat sink 4 and the lateral heat dissipating members 5 which are connected with the internal biasing heat sink 4 are provided for the upper receiving space 13 and the lower receiving space 14, the connector assembly 100 can completely improve the overall heat dissipating capability for various parts of the guide shielding cage 1.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. A connector assembly, comprising:
   a guide shielding cage which comprises a cage body and a partitioning bracket provided in the cage body, the cage body having a top wall and two side walls, the partitioning bracket having an upper wall and a lower wall which together define an interior receiving space, and the partitioning bracket and the cage body together defining an upper receiving space and a lower receiving space, the top wall of the cage body being formed with an upper window which is communicated with the upper receiving space, each side wall of the cage body being formed with a side window which is communicated with the interior receiving space, the lower wall of the partitioning bracket being formed with a lower window which allows the interior receiving space to be communicated with the lower receiving space;
   an external heat sink which is provided to the top wall of the cage body and enters into the upper receiving space via the upper window;
   an internal biasing heat sink which is provided in the partitioning bracket and has an internal heat dissipating member, the internal heat dissipating member entering into the lower receiving space via the lower window, the internal heat dissipating member being capable of moving along an up-down direction; and
   two lateral heat dissipating members which are respectively positioned outside the two side walls of the cage body, the two lateral heat dissipating members and the internal heat dissipating member being connected with each other by means of a connecting structure which passes through the side windows, a width of the side window in the up-down direction being larger than a width of the connecting structure in the up-down direction, so that the two lateral heat dissipating members are capable of moving with the internal heat dissipating member along the up-down direction, wherein
   the connecting structure comprises a first connecting portion which is formed to the internal heat dissipating member and a second connecting portion which is formed to the lateral heat dissipating member, and the first connecting portion and the second connecting portion can be locked by means of a locking member.

2. The connector assembly of claim 1, wherein the connecting structure further comprises a positioning post and a positioning hole which cooperate with each other and are formed to the first connecting portion and the second connecting portion.

3. The connector assembly of claim 2, wherein the connecting structure further comprises a thermally conductive material connecting layer which is provided between the first connecting portion and the second connecting portion.

4. The connector assembly of claim 3, wherein the first connecting portion and the second connecting portion each are a convex structure.

5. The connector assembly of claim 1, wherein
   the internal heat dissipating member has a thermal coupling portion which enters into the lower receiving space via the lower window,
   the internal biasing heat sink further comprises a biasing spring which is provided between the internal heat dissipating member and the upper wall of the partitioning bracket.

6. The connector assembly of claim 1, wherein
   the lateral heat dissipating member has a plate body which extends along the corresponding side wall and heat dissipating fins which are formed outwardly from the plate body,
   the internal heat dissipating member has a base plate and heat dissipating fins which are formed upwardly from the base plate.

7. The connector assembly of claim 6, wherein the heat dissipating fins of the internal heat dissipating member extend along a front-rear direction of the guide shielding cage and are arranged side by side in a left-right direction of the guide shielding cage.

8. The connector assembly of claim 6, wherein the base plate comprises a thermal coupling portion that enters into the lower receiving space via the lower window.

9. The connector assembly of claim 1, wherein the cage body further comprises a bottom wall and a rear wall, the bottom wall being connected to front segments of bottom edges of the two side walls, the rear wall being connected to a rear edge of the top wall and rear edges of the two side walls.

10. The connector assembly of claim 9, wherein the cage body comprises a plurality of press-fitting legs, the press-fitting legs being formed along the bottom edges of the two side walls and along a bottom edge of the rear wall.

11. The connector assembly of claim 1, wherein the external heat sink comprises an external heat dissipating member, a base plate, and a clip that attaches the external heat sink to the cage body.

12. The connector assembly of claim 11, wherein the clip comprises two pressing portions and two side plate portions, each pressing portion extending along a left-right direction of the guide shielding cage across a segment of the base plate, the two side plate portions extending along a front-rear direction of the guide shielding cage and connecting the two pressing portions.

13. The connector assembly of claim 12, wherein the two side plate portions latch with the two side walls.

14. The connector assembly of claim 12, wherein the two pressing portions are elastic and contact the base plate.

15. The connector assembly of claim 1, wherein
   the partitioning bracket comprises a partitioning bracket grounding member attachable to a front segment of the partitioning bracket,
   a front wall of the partitioning bracket comprises a plurality of first front heat dissipating holes, a front wall of the partitioning bracket grounding member comprises a plurality of second front heat dissipating holes.

16. A connector assembly, comprising:
a guide shielding cage comprising a cage body and a partitioning bracket, the cage body comprising a top wall and two side walls, the partitioning bracket comprising an upper wall and a lower wall which together define an interior receiving space, the partitioning bracket and the cage body together defining an upper receiving space and a lower receiving space, the top wall of the cage body comprising an upper window which is communicated with the upper receiving space, each side wall of the cage body comprising a side window which is communicated with the interior receiving space, the lower wall of the partitioning bracket comprising a lower window which allows the interior receiving space to be communicated with the lower receiving space;
an external heat sink provided to the top wall of the cage body and enters into the upper receiving space via the upper window;
an internal biasing heat sink provided in the partitioning bracket and comprising an internal heat dissipating member, the internal heat dissipating member entering into the lower receiving space via the lower window, the internal heat dissipating member being capable of moving along an up-down direction; and
two lateral heat dissipating members which are respectively positioned outside the two side walls of the cage body, the two lateral heat dissipating members and the internal heat dissipating member being connected with each other by a connecting structure which passes through the side windows, the two lateral heat dissipating members being capable of moving with the internal heat dissipating member along the up-down direction, wherein the connecting structure comprises a positioning post on a first connecting portion of the internal heat dissipating member and a positioning hole on a second connecting portion of the lateral heat dissipating member.

17. The connector assembly of claim 16, wherein the connecting structure further comprises a thermally conductive material connecting layer which is provided between the first connecting portion and the second connecting portion.

18. The connector assembly of claim 16, wherein the first connecting portion and the second connecting portion each are a convex structure.

19. The connector assembly of claim 16, wherein the top wall comprises a plurality of top dissipating holes, the plurality of top dissipating holes being communicated with the upper receiving space.

20. The connector assembly of claim 16, wherein
the partitioning bracket comprises a partitioning bracket grounding member attachable to a front segment of the partitioning bracket,
a front wall of the partitioning bracket comprises a plurality of first front heat dissipating holes,
a front wall of the partitioning bracket grounding member comprises a plurality of second front heat dissipating holes.

* * * * *